US012689528B2

(12) United States Patent
Hua et al.

(10) Patent No.: US 12,689,528 B2
(45) Date of Patent: Jul. 21, 2026

(54) METHOD FOR IMPLEMENTING MUTUAL AUTHENTICATION PROTOCOL BASED ON RADIO FREQUENCY FINGERPRINT AND FUZZY EXTRACTOR

(71) Applicant: Shanghai Jiao Tong University, Shanghai (CN)

(72) Inventors: Cunqing Hua, Shanghai (CN); Chengchen Zhu, Shanghai (CN); Jianan Hong, Shanghai (CN); Yue Wu, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 199 days.

(21) Appl. No.: 18/365,967

(22) Filed: Aug. 4, 2023

(65) Prior Publication Data

US 2024/0163116 A1 May 16, 2024

(30) Foreign Application Priority Data

Nov. 15, 2022 (CN) .......................... 202211431564.1

(51) Int. Cl.
*H04L 9/32* (2006.01)
*H04L 9/08* (2006.01)
*H04L 9/30* (2006.01)
(52) U.S. Cl.
CPC .......... *H04L 9/3273* (2013.01); *H04L 9/0869* (2013.01); *H04L 9/3073* (2013.01)
(58) Field of Classification Search
CPC .... H04L 9/3273; H04L 9/0869; H04L 9/3073
See application file for complete search history.

(56) References Cited

U.S. PATENT DOCUMENTS

| | | | |
|---|---|---|---|
| 2010/0085853 A1* | 4/2010 | Kirovski | .......... G11B 20/00123 |
| 2014/0108786 A1* | 4/2014 | Kreft | .................. G06Q 20/3825 |
| | | | 713/194 |
| 2019/0349207 A1* | 11/2019 | Merchan | ............... H04L 9/3242 |
| 2021/0256536 A1* | 8/2021 | Abdelsamie | ......... G06Q 30/018 |
| 2023/0246820 A1* | 8/2023 | Christodorescu | ..... H04L 9/0894 |
| | | | 713/171 |

OTHER PUBLICATIONS

Dodis et al., "Fuzzy Extractors: How to Generate Strong Keys from Biometrics and Other Noisy Data", 2004, Advances in Cryptology EUROCRYPT 2004, pp. 523-540 (Year: 2004).*

* cited by examiner

*Primary Examiner* — William S Powers
(74) *Attorney, Agent, or Firm* — Mei & Mark LLP; Manni Li

(57) ABSTRACT

A mutual authentication protocol based on radio frequency (RF) fingerprint and fuzzy extractor is provided. Two kinds of nodes in the protocol are denoted by authenticator and verifier respectively. In the registration phase, the verifier sends a registration request to the verifier, the verifier receives its RF fingerprint and uses the fuzzy extractor to process it. After storing the help string P related to the verifier, the key generated by R is returned to the verifier, and the verifier stores the key after receiving it. In the authentication phase, the verifier sends an encrypted message containing the challenge value to the verifier. After receiving it, the verifier recovers the key needed for decryption through the fuzzy extractor using the extracted RF fingerprint and the previously stored P value, and returns a reply message to the verifier to achieve the final two-way authentication effect.

3 Claims, 3 Drawing Sheets

Authenticator

Sending registration request

Verifier

Fuzzy extractor is used to process the RF fingerprint to get P and R. P is stored, and R is used to generate the key Return key Store key

Authenticator

Verifier

(1) Registration request (2-1)

Gen(w) = R, P

R → sk, pk (2-2) Return pk (3) Store pk

Store P (4-1) Find pk (4-2) m = encrypt(ch, pk) + Authenticator + hash(ch)

(5-1)

Find P

Rep(w', P) = R

R → sk, pk (6) Verify with pk (5-2) signature(ch, sk)

Decrypt (m, sk) = ch

D₁ | D₂ | •••••• | D₅₁₁ | D₅₁₂

Quantized to integers

1 | 3 | •••••• | 4 | 15

512 dimensions

Distinguished by Hamming distance 0000 0000 0000 0001 | 0000 0000 0000 0111 | •••••• | 0000 0000 0000 1111 | 0111 1111 1111 1111

1

METHOD FOR IMPLEMENTING MUTUAL AUTHENTICATION PROTOCOL BASED ON RADIO FREQUENCY FINGERPRINT AND FUZZY EXTRACTOR

CROSS-REFERENCE TO RELATED APPLICATIONS

The subject application claims priority on Chinese Patent Application No. 202211431564.1 filed on Nov. 15, 2022. The contents and subject matters of the Chinese priority application are incorporated herein by reference.

TECHNICAL FIELD

The present invention relates to wireless device authentication, in particular, a method for implementing mutual authentication protocol based on radio frequency (RF) fingerprint and fuzzy extractor.

BACKGROUND ART

With the rapid development of 5G technology and Internet of Things in recent years, mobile phone users and Internet of Things devices are on the rise. According to the 2022 Statistical Report on the Development of China's Internet Network, in the information and communication industry, as of December 2021, a total of 1.425 million 5G base stations had been built and opened, and the number of new 5G base stations reached 654,000 throughout the year. The number of industrial internet platforms with national influence has exceeded 150, and the total number of access devices has exceeded 76 million. More than 2,000 "5G+ Industrial Internet" projects are under construction nationwide. The integration and innovative application of industrial Internet and 5G in key industries of the national economy is accelerating.

The data show that China's information construction has made great results, the number of users is increasing, people are more accustomed to the internet into our lives. At the same time, it also brings great challenges to the security of authentication in related fields. Generally speaking, traditional authentication protocols rely on key technology and handshake protocol, which brings a lot of risks. For example, in a man-in-the-middle attack, the attacker can create separate connections with both parties and exchange the received data, making both parties think they are communicating over a private connection. In addition, there will be ALTER attack, forgery attack, and other attack methods.

Fuzzy extractor technology has attracted more and more attention in the field of cyberspace security in recent years because it can solve the problem of key storage in cryptography. Combined with the characteristics of biometrics, it provides a new idea for more secure authentication protocols. Fuzzy extractor can generate key from one fingerprint information and reproduce the previous key when the subsequent fingerprint information of the same source arrives. So it is helpful to solve the problem of key storage for the authenticator, yet it loses the security of fingerprint identification to some extent.

Radio frequency fingerprinting technology is a technology that has emerged with the development of AI technology in recent years. It uses the physical characteristics of the sending device to distinguish different devices, rather than simply based on the signaling content, which brings higher security than the traditional authentication mode. According to its characteristics, radio frequency (RF) fingerprints are very suitable for verification related work.

SUMMARY OF THE INVENTION

To solve the problems of the current technology, the present invention provides a mutual authentication protocol based on RF fingerprint and fuzzy extractor for a communication process with two nodes, which comprises the following steps:

Step 1. In the registration phase, the authenticator sends a registration request to the verifier, the verifier receives its RF fingerprint and uses the fuzzy extractor to process it. After storing the help string P related to the authenticator, the key generated by R is returned to the authenticator, and the authenticator receives it and stores it.

Step 2. In the authentication phase, the authenticator sends an encrypted message containing the challenge value to the verifier. After receiving it, the verifier recovers the key needed for decryption through the fuzzy extractor using the extracted RF fingerprint and the previously stored P value, and returns a reply message to the authenticator to achieve the final mutual authentication.

In step 1, after receiving the registration request, the verifier uses the fuzzy extractor to generate R and the help string P. If an asymmetric key pair is generated by R for use in the method, the specific steps are as follows:

(2-1) After receiving the registration request from the authenticator, the verifier first needs to obtain the output result of the RF fingerprint features and quantize them to obtain the fingerprint data w.

(2-2) The processed RF fingerprint data w is used as the input of the fuzzy extractor and the generating function is executed as follows to generate R and P:

$$R,P=\text{Generate}(w),$$

wherein R is the secret value that is used to generate the asymmetric public-private key pair, namely, comprising the public key pk and the private key sk. P is a help value that is used as an input in the reproduction function to output the same R value along with the RF fingerprint data. Here, the verifier first needs to store the authenticator information and its corresponding P value, and then returns the public key pk to the authenticator. The authenticator receives and stores the public key pk corresponding to the verifier.

In step 2, the challenge-response mechanism is used and the fuzzy extractor is used to execute the reproduction function to obtain the same R value as the registration phase for mutual authentication. If the asymmetric key pair generated by R is used, the specific steps are as follows:

(3-1) The authenticator first uses the random number generation function to obtain a challenge value ch.

(3-2) The authenticator finds the public key pk corresponding to the verifier in its own node, encrypts the ch value with the public key pk, and sends it to the verifier with the following message:

$$m=\text{encrypt}(ch,pk)+\text{authenticator}+\text{hash}(ch).$$

(3-3) After receiving the message from the authenticator, the verifier searches for the P value corresponding to the authenticator in its own node, and at the same time gets the output result of the RF fingerprint features and quantifies them to obtain the fingerprint data w'.

(3-4) The verifier takes the fingerprint data w' and the P value as the input of the fuzzy extractor, performs the reproduction function to obtain the same R as in the registration phase:

$$R=\text{Reproduce}(w',P).$$

(3-5) The verifier generates the same public and private key pair according to R and obtains the private key sk; the verifier uses the private key sk to decrypt the received message and obtain the ch value:

$$ch=\text{decrypt}(m,sk),$$

wherein if the decryption is successful and the hash values are the same, the verifier has successfully authenticated the identity of the authenticator.

(3-6) The verifier signs ch with the private key sk and sends the message to the authenticator. Upon receipt, the authenticator verifies using the public key pk, and if the verification passes, the authenticator authenticates the identity of the verifier.

In step 1, after receiving the registration request, the verifier uses the fuzzy extractor to generate R and the help string P. If the symmetric key generated by R is used, the specific steps are as follows:

(4-1) After receiving the registration request from the authenticator, the verifier first needs to obtain the output result of the RF fingerprint features and quantize them to get the fingerprint data w.

(4-2) The processed fingerprint data w are used as the input of the fuzzy extractor and the generating function is executed as follows to obtain a string R and a help string P:

$$R,P=\text{Generate}(w),$$

wherein R is a secret value and some algorithm can be used to generate a symmetric key K. The help string P is a help value that is used as an input in the reproduction function to output the same R value along with the fingerprint data. Here, the verifier first needs to store the authenticator information and its corresponding P value, and then returns the symmetric key K to the authenticator, and the authenticator stores the verifier corresponding to K after receiving it. Here, we consider that the channel during registration is secure.

In the described step 2, the challenge-response mechanism is used and the fuzzy extractor is used to execute the reproduction function to obtain the same R value as the registration phase for mutual authentication. If the symmetric key is generated by using R, the specific steps are as follows:

(5-1) The authenticator first uses the random number generation function to obtain a challenge value ch.

(5-2) The authenticator finds the symmetric key K of the verifier in its own node, encrypts the ch value with K, generates a hash value and sends it to the verifier. The message content is as follows:

$$m=\text{encrypt}(ch,K)+\text{authenticator}+\text{hash}(ch).$$

(5-3) After receiving the message from the authenticator, the verifier searches for the P value corresponding to the authenticator in its own node, and at the same time gets the output result of the RF fingerprint features and quantifies them to obtain the fingerprint data w'.

(5-4) The verifier takes the fingerprint data w' and P as the input of the fuzzy extractor and executes the reproduction function to obtain the same R as in the registration phase:

$$R=\text{Reproduce}(w',P).$$

(5-5) The verifier generates the same symmetric key K according to R. The verifier uses K to decrypt the received message and obtain the ch value:

$$ch=\text{decrypt}(m,K),$$

wherein if the hash value is successfully decrypted and verified, the verifier has successfully authenticated the identity of the authenticator.

(5-6) The verifier uses the hash function with the key K to sign the ch and sends the message to the authenticator. After receiving it, the authenticator verifies using K. If the verification passes, the authenticator authenticates the identity of the verifier.

Compared with the current technology, the technical effects of the present invention are as follows. Compared with the traditional authentication protocol, the security of the key and the reliability of the protocol are greatly improved.

Firstly, using the technology of combining fuzzy extractor and RF fingerprint, it realizes the secure storage of the key and a fast mutual authentication process. For the traditional authentication method, since its premise is the security of the key, it needs extra overhead to ensure that the key is not leaked, so as to ensure the security of the whole protocol process.

Both parties in the invention do not need to save the vital private key, only need to save some extra help information, which saves a lot of resources and improves the security of the protocol itself.

For the attacker, because of the use of RF fingerprints, if he does not have access to the original fingerprint party's device, it is difficult for him to forge the correct fingerprint information for authentication. At the same time, the data stored in the two sides has nothing to do with the information of the two sides themselves, and if the attacker knows it, it will not cause a very serious impact.

Figure 1:
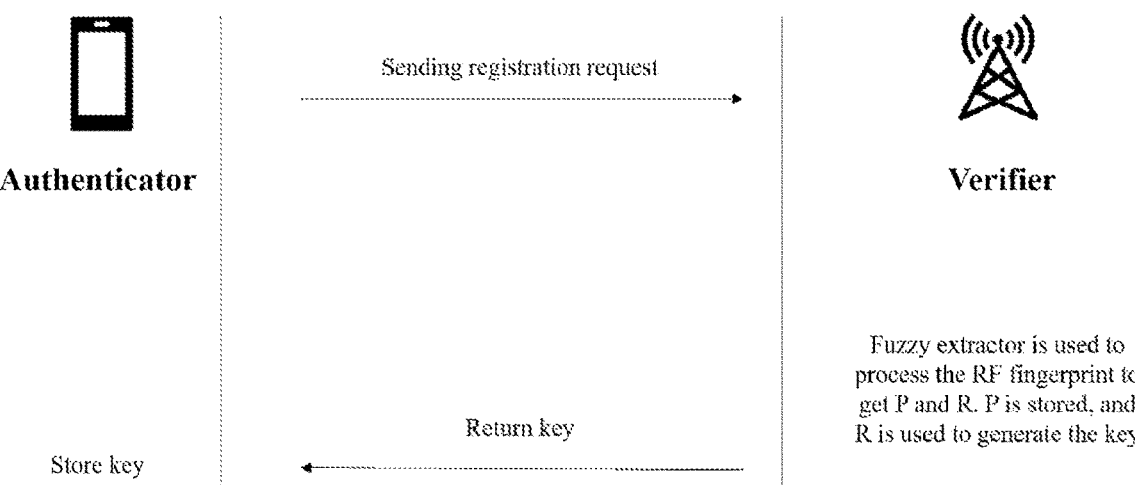
FIG. 1 shows the registration phase in the present invention.
Figure 2:
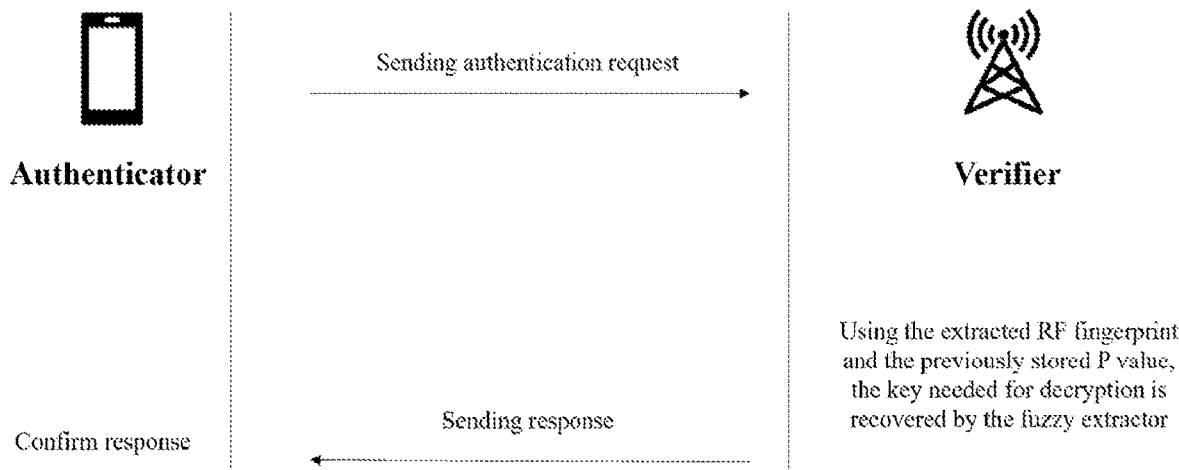
FIG. 2 shows the authentication phase in the present invention.

DETAILED DESCRIPTION OF THE
INVENTION AND EMBODIMENTS

The present invention shall be further explained in conjunction with the accompanying drawings and embodiments, but the scope of protection of the present invention shall not be limited thereby.

For both communication parties, the authenticator can be a small electronic device, such as an IoT device, while the verifier can be a larger server or gateway, executing the entire protocol between the two. Because the protocol is carried out by two methods based on symmetric key and asymmetric key, they are explained separately.

The present invention provides a method for implementing bidirectional authentication based on RF fingerprint and fuzzy extractor using two types of nodes denoted by an authenticator and a verifier, respectively, comprising (1) in a registration phase, sending a registration request from a radio frequency (RF) fingerprint based authenticator to a verifier, extracting the RF fingerprint features based on the registration request, processing the RF fingerprint features through a fuzzy extractor, and generating a help string P related to the authenticator and a string R used for generating a key in the verifier, storing the help string P in the verifier and sending the string R from the verifier to the authenticator, and storing the string R in the authenticator; and (2) in an authentication phase, using a random number generation function to generate a challenge value ch and using the key generated by the string R to encrypt a message in the authenticator, and sending the message from the authenticator to the verifier, using the RF fingerprint features and the help string P obtained in the registration phase to recover the same string R as the registration phase and the string R used for generating the key through the fuzzy extractor in the verifier, generating the key needed for decryption by using the string R, decrypting the message received, and returning a reply message from the verifier to the authenticator, verifying the reply message by the authenticator, and authenticating an identity of the verifier after passing the verification, and completing a process of mutual authentication.

The present invention further provides that the key generated by string R may be an asymmetric key pair prepared by the following steps: (1) in the registration phase, conducting a quantitative processing by the verifier to obtain fingerprint data w after receiving the registration request sent by the authenticator and extracting the RF fingerprint features, using the fingerprint data w as an input for the fuzzy extractor and executing a generation function: R,P=Generate(w), wherein the string R is used to generate a public-private key pair of the asymmetric key comprising a public key pk and a private key sk, P is the help string related to the authenticator and used as an input for the generation function and outputs a same string R value together with the fingerprint data w, storing in the verifier the help string P corresponding to the authenticator's information and returning the public key pk to the authenticator, corresponding the verifier to the public key pk and storing the public key pk in the authenticator; (2) in the authentication phase, using a random number generation function to obtain a challenge value ch in the authenticator, searching the public key pk related to the verifier by the authenticator within authenticator's own node, encrypting the challenge ch value using the public key pk, and sending an encrypted message to the corresponding verifier with the following content: m=encrypt(ch,pk)+authenticator+hash(ch), searching for the help string P related to the authenticator in the verifier within the verifier's own node, and quantifying the RF fingerprint features obtained as in the registration phase to obtain a fingerprint data w', using the fingerprint data w' and P as input to the fuzzy extractor, and executing a reproduction function to recover the same string R as in the registration phase: R=Reproduce(w',P), generating by the verifier the same public and private key pair based on the string R comprising the private key sk, and using the private key sk to decrypt the received message and obtain a ch value: ch=decrypt(m,sk), successfully authenticating the identity of the authenticator after the decryption is successful and the hash value is the same, using the private key sk to sign ch and sending the reply message from the verifier to the authenticator, using the public key pk to verify the reply message by the authenticator, and authenticating the identity of the verifier and completing the process of mutual authentication by the authenticator.

The present invention further provides that the key generated by the string R may be a symmetric key prepared by the following steps: (1) in the registration phase, after receiving the registration request from the authenticator, the verifier extracting the RF fingerprint features and quantifying the extracted RF fingerprint features to obtain fingerprint data w, using the fingerprint data w as an input of the fuzzy extractor and executing a generation function as follows: R,P=Generate(w), wherein the string R is used to generate a symmetric key K, P is the help string related to the authenticator and used as an input of the generation function and outputs the same string R value together with the fingerprint data w, the verifier storing the help string P corresponding to the authenticator's information and returning the symmetric key K to the authenticator, corresponding the verifier with the symmetric key K and storing the symmetric K by the authenticator; and (2) in the authentication phase, using a random number generation function to obtain a challenge value ch by the authenticator, the authenticator looking up the symmetric key K corresponding to the verifier in the authenticator's own node, encrypting the challenge ch value with the symmetric key K, and sends an authentication request to the corresponding verifier with the following content: m=encrypt(ch,K)+authenticator+hash(ch), the verifier searching for the help string P related to the authenticator in the verifier's own node, and quantizing the RF fingerprint features obtained as in the registration phase to obtain a fingerprint data w', using the fingerprint data w' and P as input to the fuzzy extractor, and executing a reproduction function to recover the same string R as in the registration phase: R=Reproduce(w',P), the verifier generating the same symmetric key K according to the string R, and using the symmetric key K to decrypt the received message and obtain a ch value: ch=decrypt(m,K), the verifier successfully authenticating the identity of the authenticator after the hash value is successfully decrypted and verified, the verifier using the symmetric key K to sign the ch and sending the reply message to the authenticator, after receiving the reply message, the authenticator using the symmetric key K to verify, and the authenticator authenticating the identity of the verifier after the verification passes, and completing the process of mutual authentication.

EXAMPLE 1

Figures 3, 4:
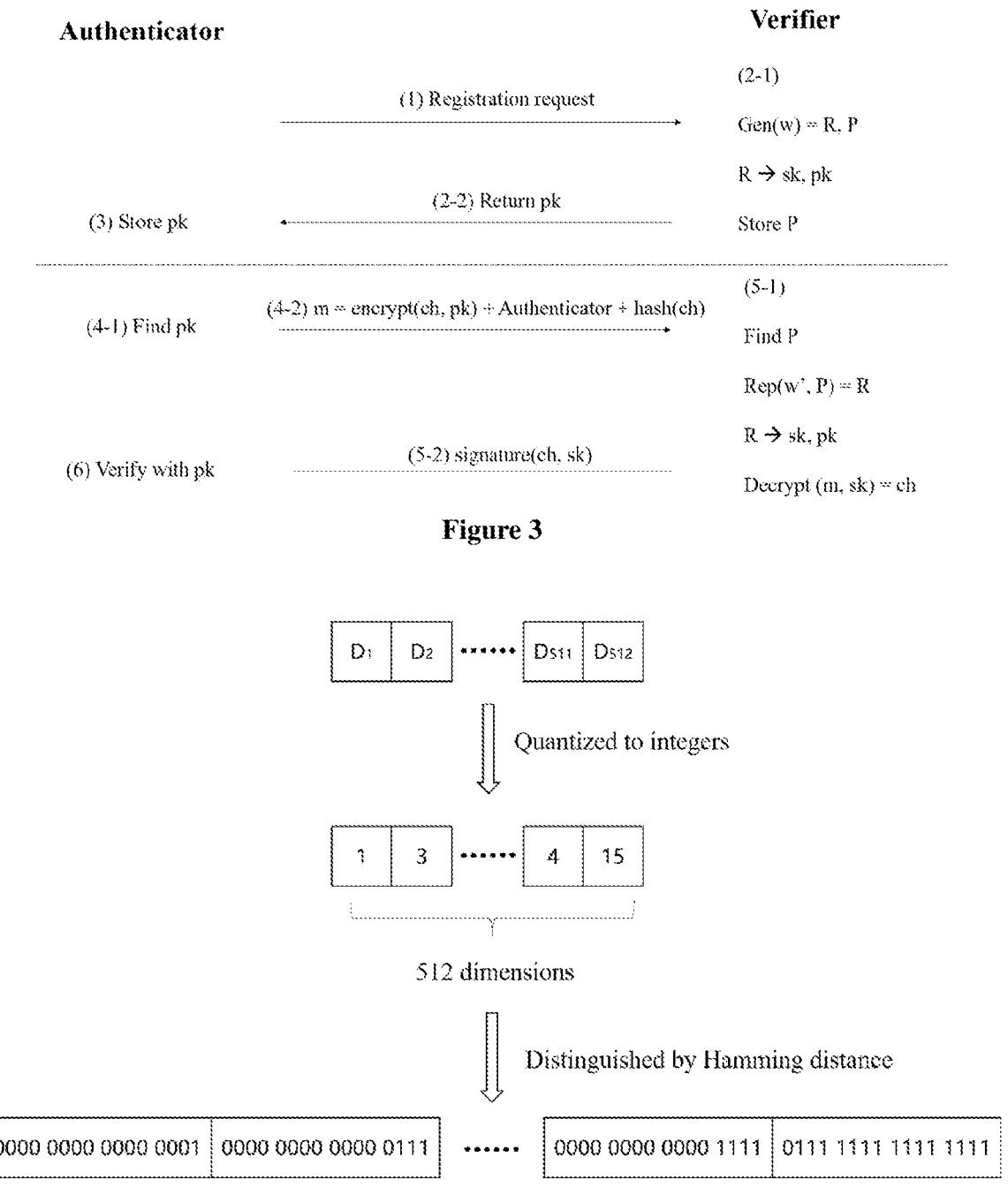
FIG. 3 is a flowchart showing the use of asymmetric keys in the first embodiment of the present invention.
FIG. 4 is the process diagram showing the fingerprint data quantization in the present invention.
Figure 5:
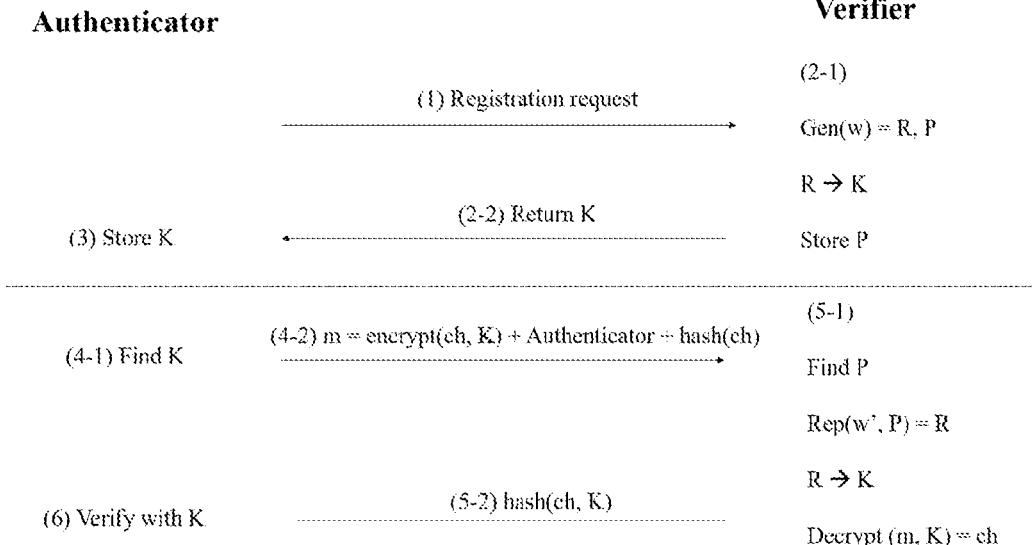
FIG. 5 is a flowchart showing the second embodiment of the present invention using a symmetric key.

The authentication process of the asymmetric key method is as follows, as shown in FIG. 3:

Step 1: The authenticator sends a registration request to the verifier.

Step 2: After receiving the registration request, the verifier uses a fuzzy extractor to generate a public-private key pair and a help string P, as follows:

As shown in FIG. 4, after receiving the registration request sent by the authenticator, the verifier first needs to obtain the output result of the RF fingerprint features and quantify them. Here, we use a 512 dimensional RF fingerprint output as an example, where the output of each dimension is within a certain range, i.e. $D_{min}$~$D_{max}$. Therefore, we can quantify each dimension, such as mapping it to the range of 0-16, as follows:

$$D_{quatization} = \left[16 \times \frac{D - D_{min}}{D_{max} - D_{min}}\right].$$

In addition, the fuzzy extractor used is distinguished by the input Hamming distance, and cannot directly use the data obtained above, requiring special processing. Taking the obtained number 2 as an example, it needs to be converted into a data format of 0000 0000 0000 0011, which means that in a 16 bit binary data, there are as many is as the original data. Finally, the binary data obtained from each dimension is concatenated to obtain the final fingerprint data w. For the processed fingerprint data w, process it as input to the fuzzy extractor and execute the generation function: R,P=Generate(w), wherein R is a secret value that can be used to generate a public-private key pair, namely the public key pk and the private key sk. P is a help value that is used as input in the reproduction function to output the same R value along with the fingerprint data. Here, the verifier first needs to store the authenticator information and the corresponding P value, and then returns the public key pk to the authenticator.

Step 3: After the authenticator receives the public key pk, it stores the corresponding key and completes the registration process.

Step 4: The authenticator initiates the authentication request as follows:

The authenticator first utilizes the random number generation function to obtain a challenge value ch. At the same time, the authenticator looks up the public key pk related to the verifier in its own node and sends the encrypted message to the verifier, the specific content of the message is as follows:

$$m=\text{encrypt}(ch,pk)+\text{authenticator}+\text{hash}(ch).$$

Step 5: After receiving the authentication request, the verifier uses the fuzzy extractor to execute the reproduction function to obtain the same R value as in the registration phase and recover the asymmetric key pair. The specific process is as follows:

After receiving the message from the authenticator, the verifier looks for the P associated with the authenticator in its own node, and at the same time gets the output result of the RF fingerprint features and quantifies them as in the registration phase. The verifier takes the fingerprint data w' and P as the input of the fuzzy extractor and performs the reproduction function to obtain the same R as in the registration phase:

$$R=\text{Reproduce}(w',P).$$

The verifier generates the same public and private key pair according to R to obtain the private key sk. The verifier uses the private key sk to decrypt the received message and obtain the ch value and the identity information of the authenticator:

$$ch+\text{authenticator}=\text{decrypt}(m,sk).$$

The verifier first checks whether the hash value of ch is the same as the hash value sent to it. If the hash values are the same, the authentication of the authenticator is completed. After that, the verifier signs ch with the private key sk and sends this message to the authenticator.

Step 6. After receiving the signature, the authenticator uses the public key pk to decrypt it, if it is the same as the previous ch value, the whole two-way authentication process is completed.

EXAMPLE 2

The authentication process of the symmetric key method is shown in FIG. 4, where the channel of the registration process is considered secure:

Step 1: The authenticator sends the registration request to the verifier.

Step 2: After receiving the registration request, the verifier uses the fuzzy extractor to generate the symmetric key K and help string P. The specific process is as follows:

After receiving the registration request from the authenticator, the verifier first needs to obtain the output result of the RF fingerprint features and quantize them. In this embodiment, 512-dimensional RF fingerprint output is adopted, and the output of each dimension is in the range of $D_{min}$~$D_{max}$. We can quantize each dimension, for example, on a scale from 0 to 16, as follows:

$$D_{quatization} = \left[ 16 \times \frac{D - D_{min}}{D_{max} - D_{min}} \right].$$

In addition, because the fuzzy extractor used is distinguished by the Hamming distance of the input, the data obtained above cannot be directly used and needs to be specially processed. Take the number 2 obtained as an example, convert it into the data format 0000 0000 0000 0011, that is, in a total of 16 bits of binary data, there are as many 1's as the original data. Finally, the binary data obtained from each dimension were concatenated to obtain the final fingerprint data w. For the processed fingerprint data w, we process it as the input of the fuzzy extractor and execute the generating function:

$$R,P=\text{Generate}(w),$$

wherein R is a secret value and some algorithm can be used to generate a symmetric key K. P is a help value that is used as input in the reproduction function to output the same R value along with the fingerprint data. Here, the verifier first needs to store the authenticator information and the corresponding P help value value, and then returns the key K to the authenticator.

Step 3: After the authenticator receives the key K, it stores the corresponding key and completes the registration process.

Step 4: The authenticator initiates the authentication request as follows:

The authenticator first utilizes the random number generation function to obtain a challenge value ch. At the same time, the authenticator looks for the key K related to the verifier in its own node and sends the encrypted message to the other party, the specific content of the message is as follows:

$$m=\text{encrypt}(ch,K)+\text{authenticator}+\text{hash}(ch).$$

Step 5: After receiving the authentication request, the verifier uses the fuzzy extractor to execute the reproduction function to obtain the same R value as in the registration phase and recover the key. The specific process is as follows:

After receiving the message from the authenticator, the verifier looks for the P associated with the authenticator in its own node, and at the same time gets the output result of the RF fingerprint features and quantifies them as in the registration phase to get fingerprint data w'. The verifier takes the fingerprint data w' and P as the input of the fuzzy extractor and performs the reproduction algorithm to obtain the same R as in the registration phase:

$$R=\text{Reproduce}(w',P).$$

The verifier generates the same symmetric key according to R, namely key K. The verifier uses the key K to decrypt the received message and obtain the ch value and the identity information of the authenticator:

$$ch+\text{authenticator}=\text{decrypt}(m,sk).$$

The verifier first checks whether the hash value of ch is the same as the hash value sent to it. If the hash values are the same, the authentication of the authenticator is completed. After that, the verifier uses the key K to generate a hash value for ch and sends this message to the authenticator.

Step 6. After receiving the reply message, the authenticator uses the key K to decrypt it, if it is the same as the previous ch value, the whole two-way authentication process is completed.

The present invention realizes the terminal security and privacy authentication based on RF fingerprint through the fuzzy extractor. In this process, the verifier does not need to store the user's characteristic information, so as to form an efficient and reliable mutual authentication protocol.

We claim:

1. A method for RF fingerprint and fuzzy extractor based bidirectional authentication between an authenticator and a verifier, comprising (1) in a registration phase, sending a registration request from an authenticator to a verifier, wherein the registration request comprises radio frequency (RF) fingerprint features of the authenticator, obtaining the RF fingerprint features of the authenticator in the registration request by the verifier, processing the RF fingerprint features through a fuzzy extractor to obtain fingerprint data w, and using the fingerprint data w to generate a help string P related to the authenticator and a string R to be used for generating a key by the fuzzy extractor, generating the key by the fuzzy extractor by using the string R in the verifier and storing the help string P corresponding to the authenticator in the verifier, sending the key generated by the string R from the verifier to the authenticator, and receiving and storing the key generated by the string R corresponding to the verifier in the authenticator; and (2) in an authentication phase, generating a challenge value ch by a random number generation function, using the stored key generated by the string R corresponding to the verifier to encrypt a message in the authenticator, hashing the challenge value ch to obtain a hash value of the challenge value ch, and sending an authentication request comprising the encrypted message and the hash value of the challenge value ch from the authenticator to the verifier, wherein the authentication request comprises the RF fingerprint features of the authenticator, receiving the authentication request comprising the encrypted message and the hash value of the challenge value ch, obtaining the RF fingerprint features of the authenticator in the authentication request by the verifier and processing the RF fingerprint features in the authentication request as in the registration phase to obtain fingerprint data w', using the fingerprint data w' and the help string P corresponding to the authenticator stored in the verifier in the registration phase as input data in the fuzzy extractor and performing a reproduction function to recover the same string R as the string R generated in the registration phase, and using the recovered string R to generate the same key through the fuzzy extractor in the verifier as in the registration phase, decrypting the encrypted message received in the authentication request by using the generated key to obtain decrypted challenge value ch, hashing the decrypted challenge value ch to obtain a hash value of the decrypted challenge value ch, and comparing the hash value of the decrypted challenge value ch with the hash value of the challenge value ch received in the authenticator request, and if the decryption is successful and the hash values are the same, authenticating the identity of the authenticator, digitally signing with the key and returning a reply message with the digital signature from the verifier to the authenticator, verifying the reply message with the digital signature by the authenticator by using the stored key generated by the string R during the registration phase and authenticating the identity of the verifier, and completing mutual authentication.

2. The method of claim 1, wherein the key generated by string R is an asymmetric key pair consisting of a public key pk and a private key sk, and the method further comprises the following steps:

(1) in the registration phase, conducting a quantitative processing of the output of the RF fingerprint features in the registration request by the verifier to obtain the fingerprint data w after receiving the registration request sent by the authenticator, using the fingerprint data w as an input for the fuzzy extractor and executing a generation function to obtain the string R and the help string P as follows:

$$R,P=\text{Generate}(w),$$

wherein the string R is a secret value that is used to generate the asymmetric key pair of the public key pk and the private key sk, the help string P is related to the authenticator and is used together with fingerprint data processed from the RF fingerprint features of the authenticator as input for the reproduction function of the fuzzy extractor to recover the same string R, storing in the verifier the help string P corresponding to the authenticator and returning the public key pk to the authenticator, receiving and storing the public key pk corresponding to the verifier by the authenticator;

(2) in the authentication phase, generating the challenge value ch by the random number generation function in the authenticator, searching the public key pk corresponding to the verifier by the authenticator within authenticator's own node, encrypting the challenge value ch using the public key pk to obtain the encrypted message encrypt(ch,pk), hashing the challenge value ch to obtain the hash value hash(ch), and sending the authentication request comprising the encrypted message to the verifier with the following content:

$$m=\text{encrypt}(ch,pk)+\text{authenticator}+\text{hash}(ch),$$

wherein the authentication request comprises the RF fingerprint features of the authenticator, upon receiving the authentication request by the verifier, searching for the help string P corresponding to the authenticator in the verifier within the verifier's own node, obtaining and quantifying the RF fingerprint features in the authentication request as in the registration phase to obtain the fingerprint data w', using the fingerprint data w' and the help string P corresponding to the authenticator as the input to the fuzzy extractor, and executing the reproduction function to recover the same string R as the string R generated in the registration phase:

$$R=\text{Reproduce}(w',P),$$

using the recovered R to generate the same key pair of the public key pk and the private key by the verifier, and using the private key sk generated by the recovered R to decrypt the encrypted message received in the authenticator request and obtaining the decrypted challenge value ch as follows:

$$ch = decrypt(m, sk),$$

hashing the decrypted challenge value ch to obtain the hash value of the decrypted challenge value, comparing the hash value of the decrypted challenge value ch with the hash value of the challenge value ch received in the authenticator request, and the verifier successfully authenticating the identity of the authenticator after the decryption is successful and confirming that the hash values are the same, using the private key sk to digitally sign and sending a reply message with the digital signature from the verifier to the authenticator, using the public key pk to verify the reply message with the digital signature by the authenticator and authenticating the identity of the verifier, and completing the mutual authentication.

3. The method of claim 1, wherein the key generated by the string R is a symmetric key, and the method further comprises the following steps:

(1) in the registration phase, after receiving the registration request from the authenticator, the verifier obtaining the RF fingerprint features in the registration request and quantifying the RF fingerprint features to obtain the fingerprint data w, using the fingerprint data w as an input of the fuzzy extractor and executing a generation function to generate the string R and the help string P as follows:

$$R, P = Generate(w),$$

wherein the string R is used to generate a symmetric key K, the help string P is related to the authenticator and used as an input, together with the fingerprint date, in the reproduction function of the fuzzy extractor to recover the string R, generating a symmetric key K by using the string R, the verifier storing the help string P corresponding to the authenticator and returning the symmetric key K to the authenticator, receiving and storing the symmetric key K corresponding to the verifier by the authenticator; and (2) in the authentication phase, generating the challenge value ch by the random number generation function by the authenticator, the authenticator looking up the symmetric key K corresponding to the verifier in the authenticator's own node, encrypting the challenge value ch with the symmetric key K to obtain an encrypted message encrypt (ch, K), hashing the challenge value ch to obtain a hash value of the challenge value ch hash(ch), and sends an authentication request to the corresponding verifier with the following content:

$$m = encrypt(ch, K) \pm authenticator + hash(ch),$$

receiving the authentication request comprising the encrypted message and the hash value by the verifier, searching for the help string P related to the authenticator in the verifier's own node, and quantizing the RF fingerprint features in the authentication request as in the registration phase to obtain the fingerprint data w', using the fingerprint data w' and the help string P as input to the fuzzy extractor, and executing the reproduction function to recover the same string R as the string R generated during the registration phase:

$$R = Reproduce(w', P),$$

the verifier using the recovered string R to generate the same symmetric key K as in the registration phase, and using the generated symmetric key K to decrypt the encrypted message in the authentication request to obtain the decrypted challenge value ch:

$$ch = decrypt(m, K),$$

hashing the decrypted challenge value ch to obtain a hash value of the decrypted challenge value ch and comparing the hash value of the decrypted challenge value ch with the hash value of the challenge value ch in the authentication request, the verifier successfully authenticating the identity of the authenticator after decryption is successful and confirming that the hash values are the same, the verifier using the symmetric key K to digitally sign and sending a reply message with the digital signature to the authenticator, after receiving the reply message, the authenticator using the symmetric key K to verify the reply message with the digital signature, authenticating the identity of the verifier, and completing mutual authentication.

\* \* \* \* \*